United States Patent
Sagar et al.

(10) Patent No.: US 11,447,071 B2
(45) Date of Patent: Sep. 20, 2022

(54) FLEXIBLE HUB FOR HANDLING MULTI-SENSOR DATA

(71) Applicant: TEXAS INSTRUMENTS INCORPORATED, Dallas, TX (US)

(72) Inventors: Rajat Sagar, Allen, TX (US); Mihir Narendra Mody, Bengaluru (IN); Anthony Joseph Lell, San Antonio, TX (US); Gregory Raymond Shurtz, Houston, TX (US)

(73) Assignee: Texas Instmments Incorporated, Dallas, TX (US)

( * ) Notice: Subject to any disclaimer, the term of this patent is extended or adjusted under 35 U.S.C. 154(b) by 0 days.

(21) Appl. No.: 17/340,207

(22) Filed: Jun. 7, 2021

(65) Prior Publication Data

US 2021/0291735 A1    Sep. 23, 2021

Related U.S. Application Data

(63) Continuation of application No. 16/709,548, filed on Dec. 10, 2019, now Pat. No. 11,027,656.

(51) Int. Cl.
*B60R 1/00* (2022.01)
*H04N 5/225* (2006.01)

(52) U.S. Cl.
CPC ............ *B60R 1/00* (2013.01); *H04N 5/2251* (2013.01); *B60R 2300/102* (2013.01);
(Continued)

(58) Field of Classification Search
CPC ................ B60R 1/00; B60R 2300/102; B60R 2300/301; B60R 2300/408;
(Continued)

(56) References Cited

U.S. PATENT DOCUMENTS 4,228,535 A   10/1980   Workman et al.
5,566,127 A   10/1996   Hoshizaki
(Continued)

FOREIGN PATENT DOCUMENTS

KR    20130094113    8/2013

OTHER PUBLICATIONS

Nikolic, Zoran et al. "TI Gives Insight to Vision-Enabled Automotive Technologies." Texas Instruments White Paper. Oct. 2013. pp. 1-12.
(Continued)

*Primary Examiner* — Paulos M Natnael
(74) *Attorney, Agent, or Firm* — Brian D. Graham; Charles A. Brill; Frank D. Cimino

(57) ABSTRACT

A hub that receives sensor data streams and then distributes the data streams to the various systems that use the sensor data. A demultiplexer (demux) receives the streams, filters out undesired streams and provides desired streams to the proper multiplexer (mux) or muxes of a series of muxes. Each mux combines received streams and provides an output stream to a respective formatter or output block. The formatter or output block is configured based on the destination of the mux output stream, such as an image signal processor, a processor, memory or external transmission. The output block reformats the received stream to a format appropriate for the recipient and then provides the reformatted stream to that recipient.

20 Claims, 12 Drawing Sheets

(52) U.S. Cl.
CPC ... *B60R 2300/301* (2013.01); *B60R 2300/408* (2013.01); *B60R 2300/607* (2013.01); *B60R 2300/8026* (2013.01); *B60R 2300/8093* (2013.01)

(58) Field of Classification Search
CPC ...... B60R 2300/607; B60R 2300/8026; B60R 2300/8093; H04N 5/2251; H04N 5/268
See application file for complete search history.

(56) References Cited

U.S. PATENT DOCUMENTS

| | | | |
|---|---|---|---|
| 5,867,502 A * | 2/1999 | Chang | H04Q 11/0478 370/477 |
| 7,383,235 B1 | 6/2008 | Ulyanov et al. | |
| 9,509,310 B1 | 11/2016 | Goumballa et al. | |
| 9,621,254 B2 | 4/2017 | Chang | |
| 11,027,656 B1 * | 6/2021 | Sagar | B60R 1/00 |
| 2005/0259514 A1 | 11/2005 | Iseli et al. | |
| 2008/0242258 A1 | 10/2008 | Lim et al. | |
| 2009/0029670 A1 | 1/2009 | Cho et al. | |
| 2009/0284620 A1 | 11/2009 | Lablans | |
| 2010/0254705 A1 | 10/2010 | Perkins et al. | |
| 2014/0050485 A1 | 2/2014 | Masarik et al. | |
| 2015/0067748 A1 | 3/2015 | Kang et al. | |
| 2015/0304648 A1 | 10/2015 | Gulati et al. | |
| 2016/0070615 A1 * | 3/2016 | Zhong | G06F 11/10 714/776 |
| 2018/0109755 A1 | 4/2018 | Vaid et al. | |
| 2019/0250611 A1 | 8/2019 | Costin et al. | |
| 2020/0120458 A1 | 4/2020 | Aldana et al. | |

OTHER PUBLICATIONS

NPX Semiconductors. "MIPI-CSI2 Peripheral on i.MX6 MPUs." Application Note, Document No. AN5305, Rev. 0, Jul. 2016. pp. 1-32.

Texas Instruments. "AM65x/DRA80xM Processors." Technical Reference Manual. Literature No. SPRUID7D, Apr. 2018—Revised Jun. 2019. pp. 1-9, 565-592, 10748-10802.

International Search Report for PCT/US2020/064149 dated Feb. 25, 2021.

* cited by examiner

FLEXIBLE HUB FOR HANDLING MULTI-SENSOR DATA

CROSS-REFERENCE TO RELATED APPLICATIONS

This application is a continuation of U.S. patent application Ser. No. 16/709,548, filed Dec. 10, 2019, which is incorporated by reference herein in its entirety.

BACKGROUND

1. Field

The field relates to processing sensor input data in system on a chip (SoC) devices.

2. Description of the Related Art

Electronics use in automobiles is increasing daily. In addition to the conventional engine controller, transmission controller, infotainment unit, body controller and the like, the advent of numerous safety and autonomous systems are greatly increasing the processing done inside an automobile. For example, adaptive cruise control may entail intercommunication between a radar system, an engine controller and a transmission controller. As another example, in a bird's eye view display, outputs from a number of different cameras arranged at various locations are provided to a processor to process the received video and develop the resultant bird's eye view image, which is then provided to the infotainment system for display to the driver. This increase in the number and type of input sensors places large burdens on the SoC devices that receive the sensor data. Additionally, the sensor data is often used by multiple processes, increasing the demands on the SoC devices. The burden is further complicated because of the reliability requirements for the safety systems that use the sensor data.

SUMMARY

In an example, a hub is provided to receive sensor data and then distribute the data to the various systems that use the sensor data. A demultiplexer (demux) receives the streams, filters out undesired streams and provides desired streams to the proper multiplexer (mux) or muxes of a series of muxes. Each mux combines received streams and provides an output stream to a respective formatter or output block. The formatter or output block is configured based on the destination of the mux output stream, such as an image signal processor, a processor, memory or external transmission. The output block reformats the received stream to a format appropriate for the recipient and then provides the reformatted stream to that recipient.

By providing streams directly to the one or more recipients in the format appropriate for each recipient, rather than providing the streams to DRAM and then having each recipient obtain its own stream or streams and perform its own reformatting operation, delay in operating on the stream is reduced and DRAM bandwidth issues are reduced.

BRIEF DESCRIPTION OF THE FIGURES

For a detailed description of various examples, reference will now be made to the accompanying drawings in which.

DETAILED DESCRIPTION

Figure 1:
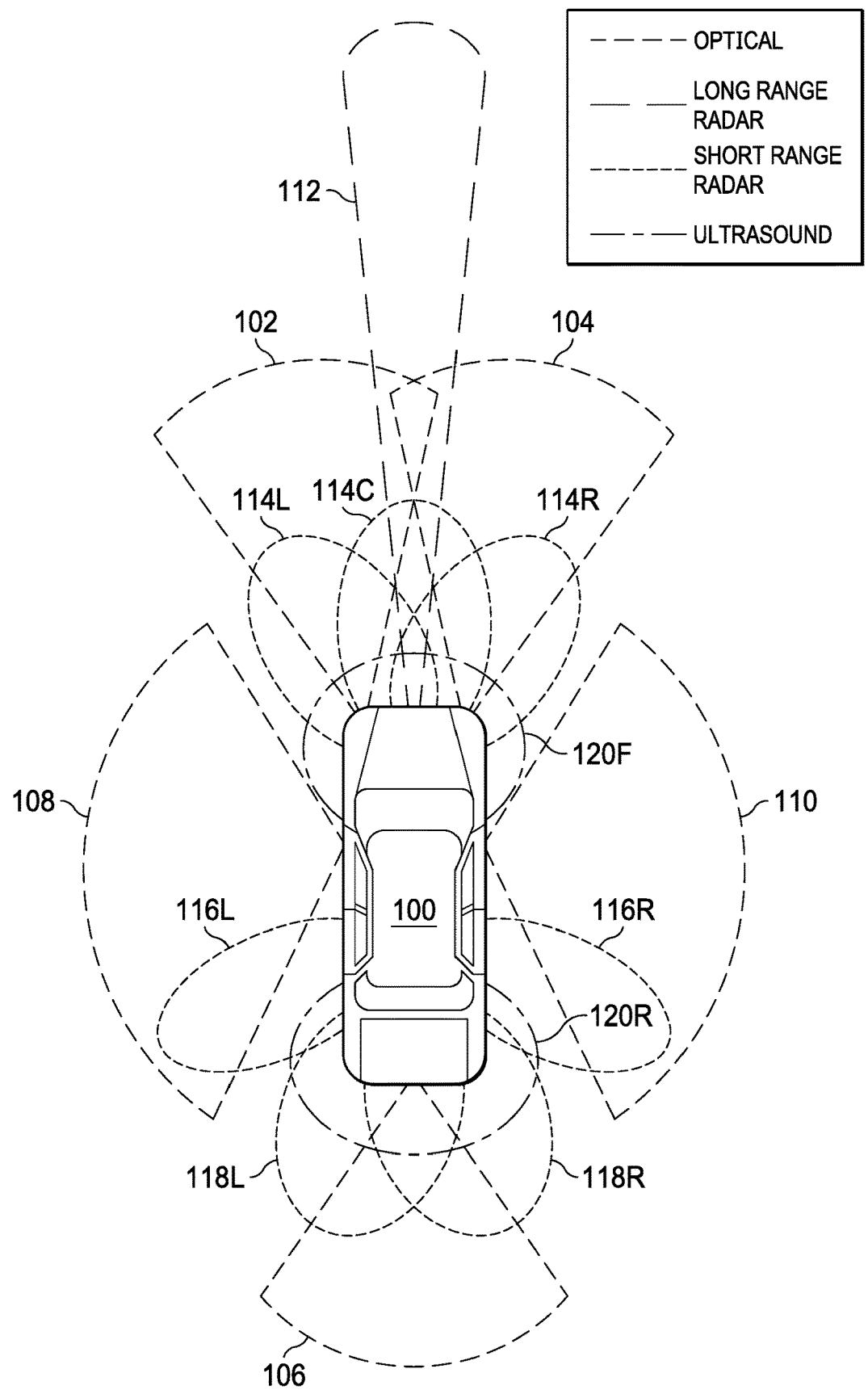
FIG. 1 is a drawing of a vehicle and the fields of view of various optical and radar sensors.

Referring now to FIG. 1, a vehicle 100 is shown. The vehicle 100 includes a set of cameras, other optical sensors, radar sensors, ultrasound sensors, and/or other suitable sensors. In various examples, the optical sensors include left camera 102 and right camera 104, which provide a stereo image from the front of the vehicle 100 for lane departure warnings, traffic sign recognition and collision alert. A rear camera 106 provides a rear view for parking assistance. A left side camera 108 provides a left-side view and a right camera 110 provides a right-side view. The captured images of the cameras 102, 104, 106, 108, 110 are combined to provide a bird's eye view.

Examples of radar sensors include a long-range radar 112 provided at the front of the vehicle 100 for adaptive cruise control. Three shorter range radar units 114L, 114C and 114R are provided at the front of the vehicle 100 enable cross traffic alert and front collision alert. Radar units 116L and 116R are provided at the left and right side of the vehicle 100 for blind spot detection. Radar units 118L and 118R are provided at the rear of the vehicle 100 for rear collision alert. Exemplary ultrasound units 120F and 120R are provided at the front and rear of the vehicle 100 for parking assistance. These camera, radar, and ultrasound sensors provide the inputs to various advanced driver assistance systems (ADAS). These sensors are just examples and many other sensors, such as LI DAR (light detecting and ranging) sensors and the like can be used as well.

Figure 2:
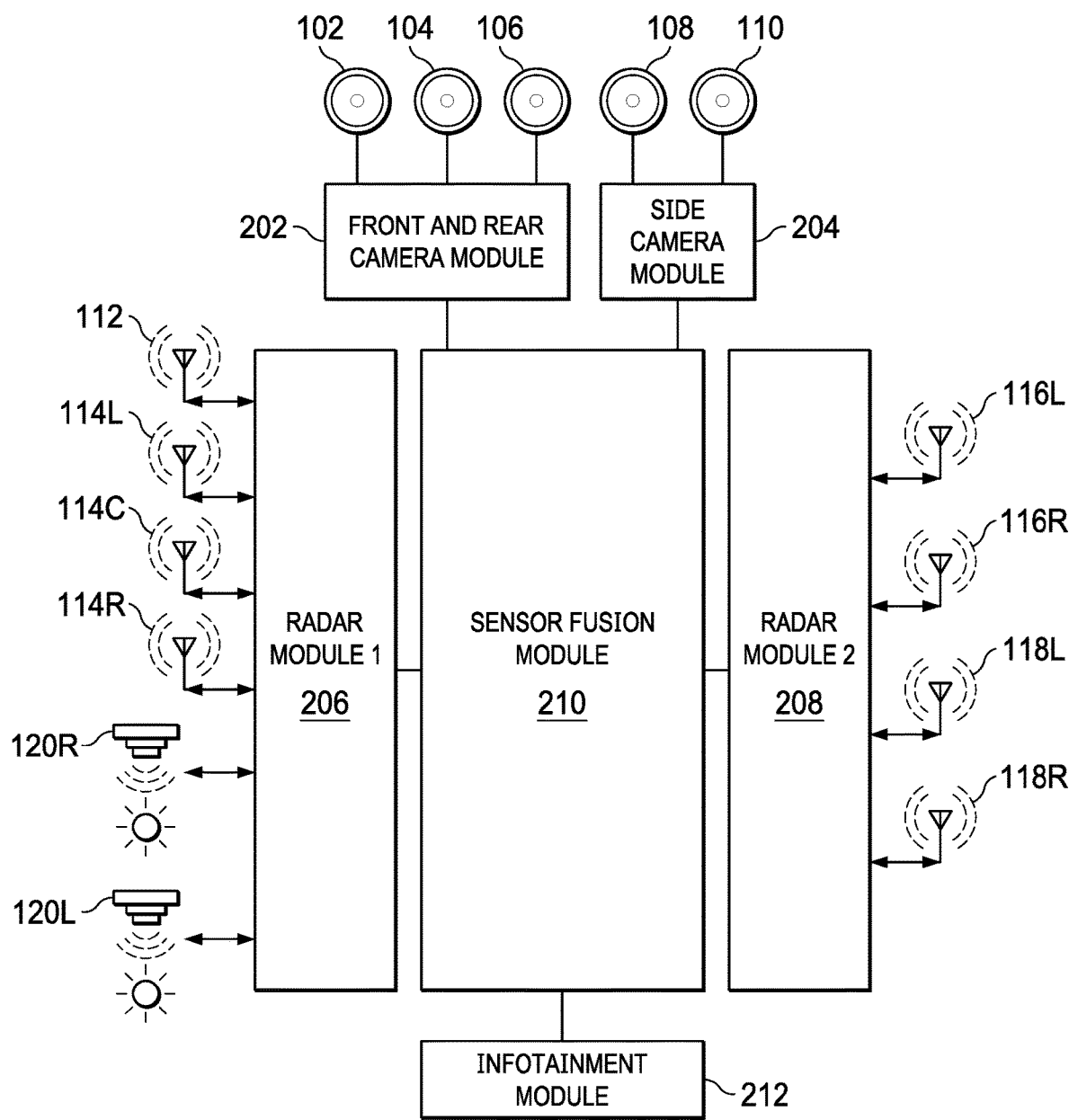
FIG. 2 is a block diagram of the vehicle of FIG. 1 including the optical and radar sensors according to some examples.

Referring now to FIG. 2, the systems and sensors of the vehicle 100 are shown. In the example, cameras 102, 104 and 106 are connected to a front and rear camera module 202. Cameras 108 and 110 are connected to a side camera module 204. Long range radar 112 and front radar units 114L, 114C, and 114R are connected to a first radar module 206. Ultrasound detectors 120R and 120L are also connected to the first radar module 206. Radar units 116L, 116R, 118L and 118R are connected to a second radar module 208. The front and rear camera module 202, the side camera module 204, the first radar module 206 and the second radar module 208 are connected to a sensor fusion module 210 which integrates the various sensor outputs developed by the other modules. An infotainment module 212 is connected to the sensor fusion module 210 to allow the driver of the car to see produced images such as a 360° bird's eye view or receive warnings when close to an obstacle. It is understood that more or fewer sensors can be connected to a given module and multiple sensor types can be provided to a single module.

Figure 3:
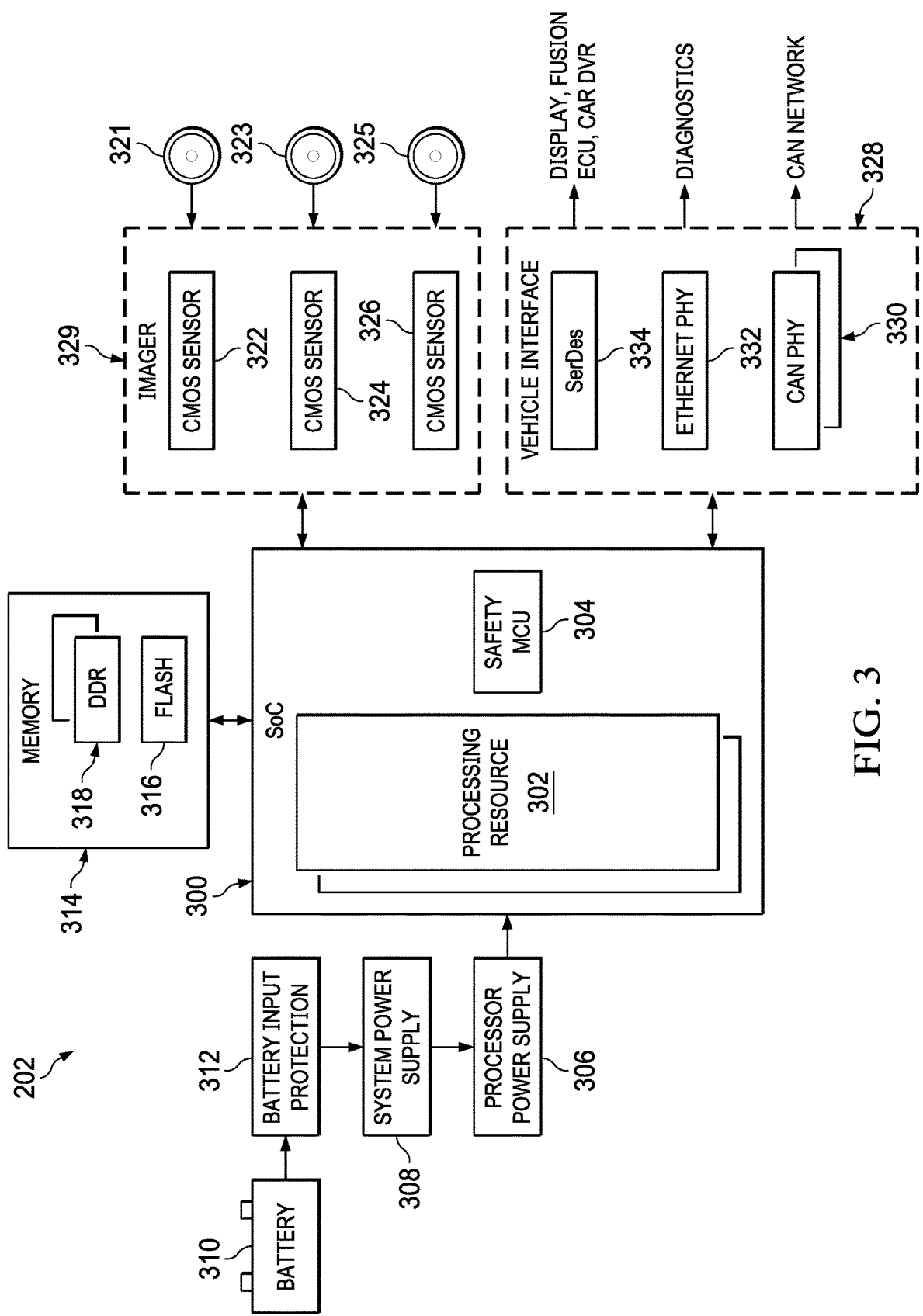
FIG. 3 is a block diagram of an optical sensor system of FIG. 2.

FIG. 3 illustrates the front and rear camera module 202 according to some examples. An SoC 300 forms the digital processing element of the front and rear camera module 202. The SoC 300 includes a processing resource 302. The processing resource 302 may include any number of interconnected processing devices ranging from cores to discrete processors and may include general purpose processing devices, digital signal processors, application-specific processors, controllers, and/or other suitable processing devices. The SoC 300 may also include a safety microcontroller (MCU) 304. A processor power supply 306 provides power to the SoC 300 and receives power from a system power supply 308. The system power supply 308 receives power from a battery 310 via battery input protection circuitry 312. Memory 314, which includes flash memory 316 and DRAM 318, is connected to the SoC 300. The flash memory 316 is non-volatile memory used to store program instructions to operate the module, including instructions to perform the functional safety and performance monitoring done by the processors, as described below. The optics 321, 323, 325 of each camera 102, 104, 106 provide light to a respective CMOS sensor 322, 324, 326 in an imager block 329. The outputs of the CMOS sensors 322, 324 and 326 are provided to the SoC 300 to provide the optical inputs. In an example the outputs are provided as Mobile Industry Processor Interface (MIPI) Alliance Camera Serial Interface 2 (MIPI CSI-2) conformant data streams. In an example the individual sensor CSI-2 data streams are provided to a CSI-2 aggregator, which combines the individual streams into a multiplexed single output stream, the individual streams becoming different virtual channels on the CSI-2 output. A vehicle interface block 328 includes a controller area network (CAN) bus PHY 330 for connection to a CAN bus network in the vehicle 100, an Ethernet PHY 332 for connection as required inside the vehicle 100 and a SerDes 334 used for connecting to various other elements in the vehicle 100 such as the sensor fusion module 210. The vehicle interface block 328 is connected to the SoC 300.

Figure 4:
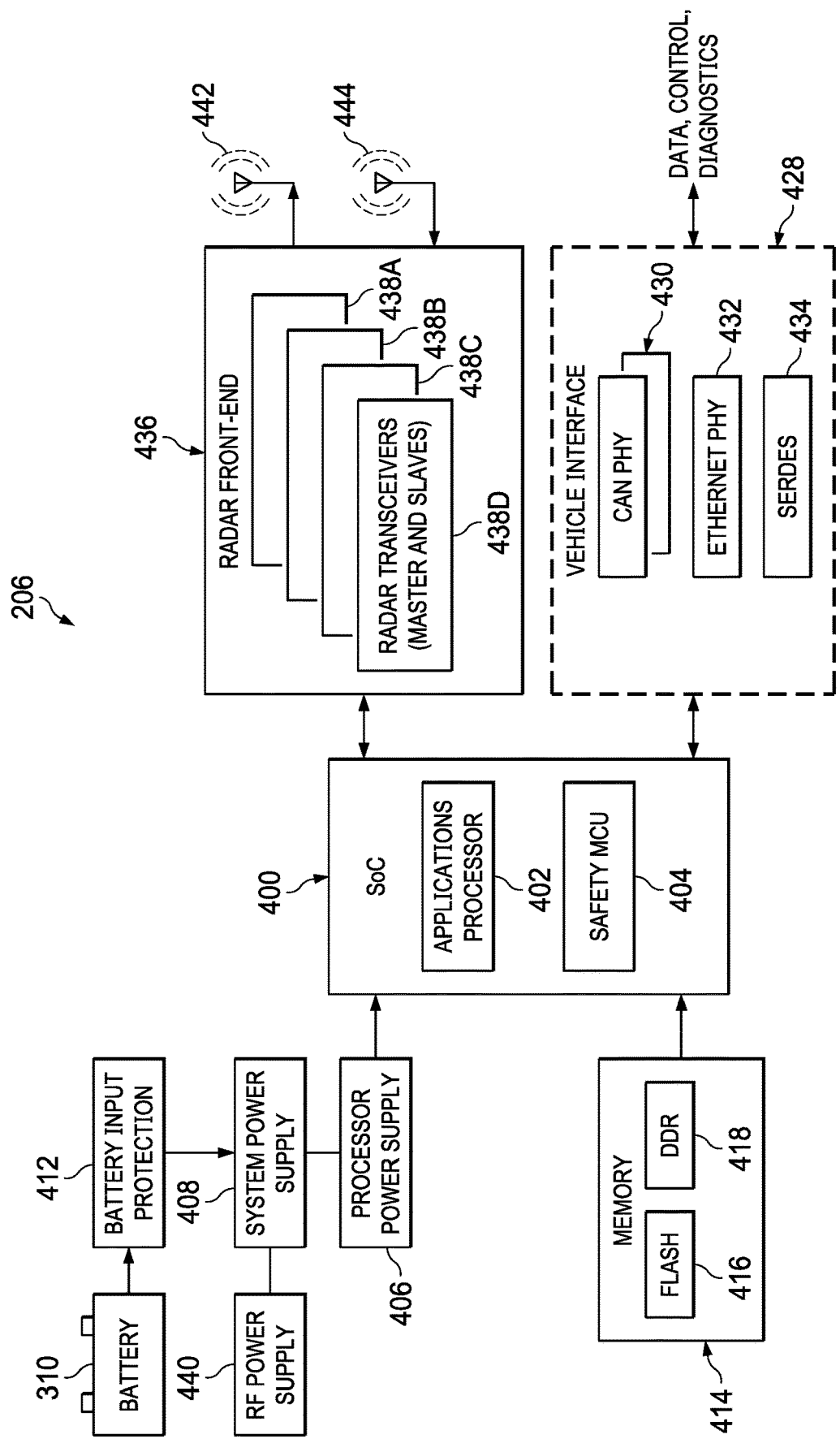
FIG. 4 is a block diagram of a radar sensor system of FIG. 2.

FIG. 4 illustrates a radar module 208 according to some examples. An SoC 400 contains the relevant processors 402 and the safety MCU 404. Processor power supply 406 is connected to the SoC 400 and receives its power from a system power supply 408. A battery 310 is connected to a battery input protection module 412, which provides its output to the system power supply 408. An RF power supply module 440 is connected to the system power supply 408. A memory 414, including flash memory 416 and DRAM 418, is connected to the SoC 400. The flash memory 416 is non-volatile memory used to store program instructions to operate the module, including instructions to perform the functional safety and performance monitoring done by the processors, as described below. Similarly, a vehicle interface block 428, including a CAN bus PHY 430, an Ethernet PHY 432 and a SerDes 434, is connected to the SoC 400 to provide connections for the module 206. A radar front end module 436 contains the individual radar transceivers 438A-D that correlate to the individual radar units 116L, 116R, 118L and 118R. The radar front end module 436 is connected to transmit 442 and receive 444 antennas. The radar front end module 436 is also connected to the SoC 400 and in an example provides a CSI-2 data steam to the SoC 400, each radar transceiver 438A-D being on a different virtual channel.

Figure 5:
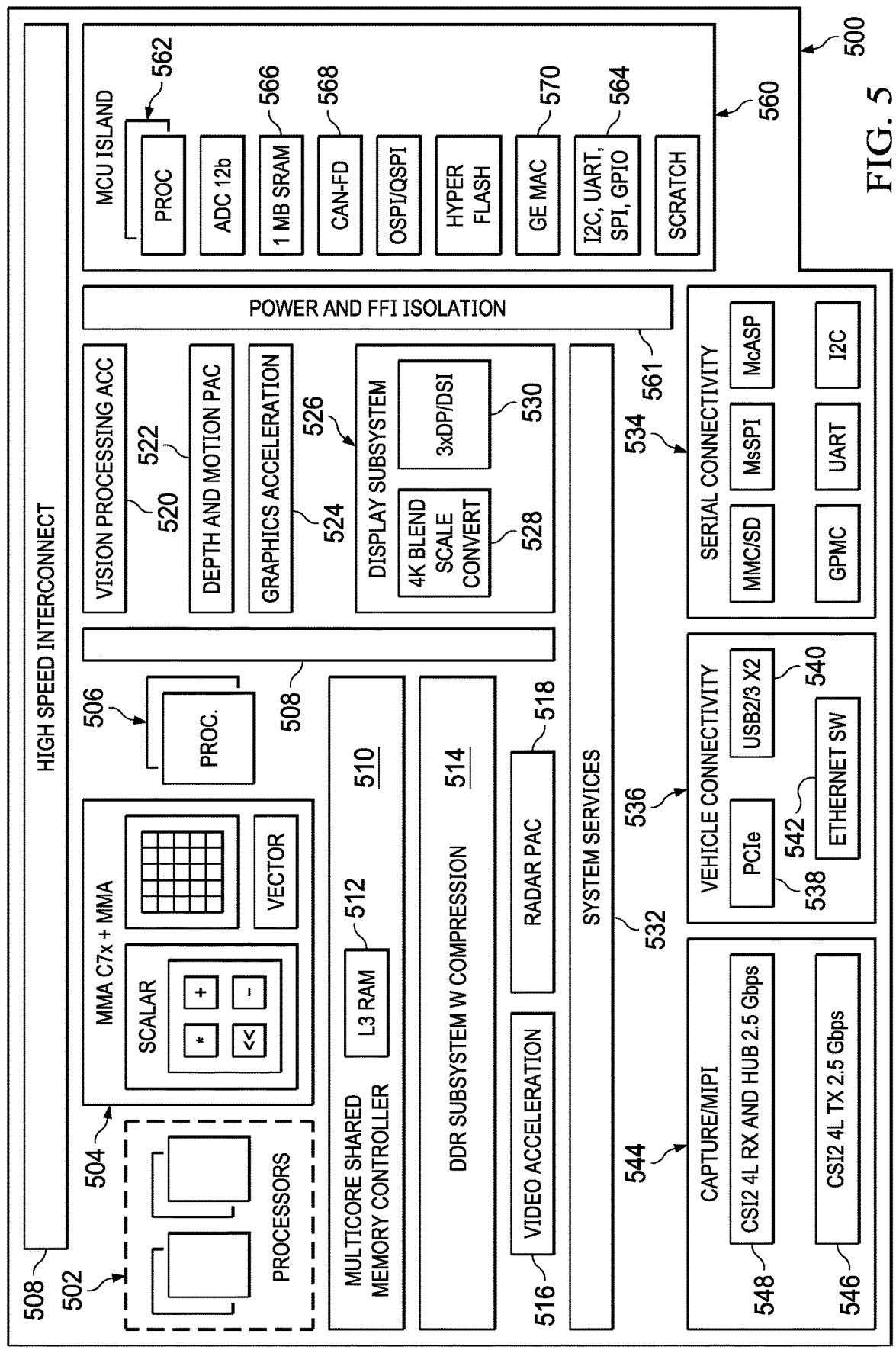
FIG. 5 is a block diagram of an SoC as used in the sensor systems of FIGS. 3 and 4.

FIG. 5 is a block diagram of an exemplary SoC 500, such as SoC 300 or SoC 400. A series of more powerful microprocessors 502, such as ARM® A72 or A53 cores, form the primary general-purpose processing block of the SoC 500, while a digital signal processor (DSP) 504 provides specialized computing capabilities. These microprocessors 502 and the DSP 504 are the processor 302 and the processor 402. A simpler microprocessor 506, such as an ARM R5F core, provides general control capability in the SoC 500. A high-speed interconnect 508 connects the microprocessors 502, DSP 504 and microprocessor 506 to various other components in the SoC 500. For example, a shared memory controller 510, which includes onboard RAM 512, is connected to the high-speed interconnect 508 to act as the onboard RAM for the SoC 500. A DDR memory controller system 514 is connected to the high-speed interconnect 508 and acts as an external interface to external DRAM. A video acceleration module 516 and a radar processing accelerator (PAC) module 518 are similarly connected to the high-speed interconnect 508. A vision processing accelerator module 520 is connected to the high-speed interconnect 508, as is a depth and motion PAC module 522. A graphics acceleration module 524 is connected to the high-speed interconnect 508. A display subsystem 526 is connected to the high-speed interconnect 508 and includes conversion logic 528 and output logic 530 to allow operation with and connection to various video monitors. A system services block 532, which includes items such as DMA controllers, memory management units, general-purpose I/O's, mailboxes and the like, is provided for normal SoC 500 operation. A serial connectivity module 534 is connected to the high-speed interconnect 508 and includes modules as conventional in an SoC. A vehicle connectivity module 536 provides interconnects such as PCIe block 538, USB block 540 and an Ethernet switch 542. A capture/MIPI module 544 includes a four-lane CSI-2 compliant transmit block 546 and a four-lane CSI-2 receive module and hub 548. Further details on the CSI-2 receive module and hub 548 are provided below.

An MCU island 560 is provided as a secondary subsystem and handles operation of the integrated SoC 500 when the other components are powered down to save energy. The MCU island 560 also operates as the safety MCU 304, 404. An MCU ARM processor 562 operates as a master and is coupled to the high-speed interconnect 508 through an isolation interface 561. An MCU general purpose I/O (GPIO) block 564 operates as a slave. MCU RAM 566 is provided to act as local memory for the MCU ARM processor 562. A CAN bus block 568 is connected to allow operation with a conventional CAN bus environment in the vehicle 100. An Ethernet MAC (media access control) block 570 is provided for further connectivity in the vehicle 100. Nonvolatile memory (NVM), such as the flash memory 316 or 416, is connected to the MCU ARM processor 562.

It is understood that this is one example of an SoC provided for explanation and many other SoC designs are possible, with varying numbers of processors, DSPs, accelerators and the like.

Figure 6:
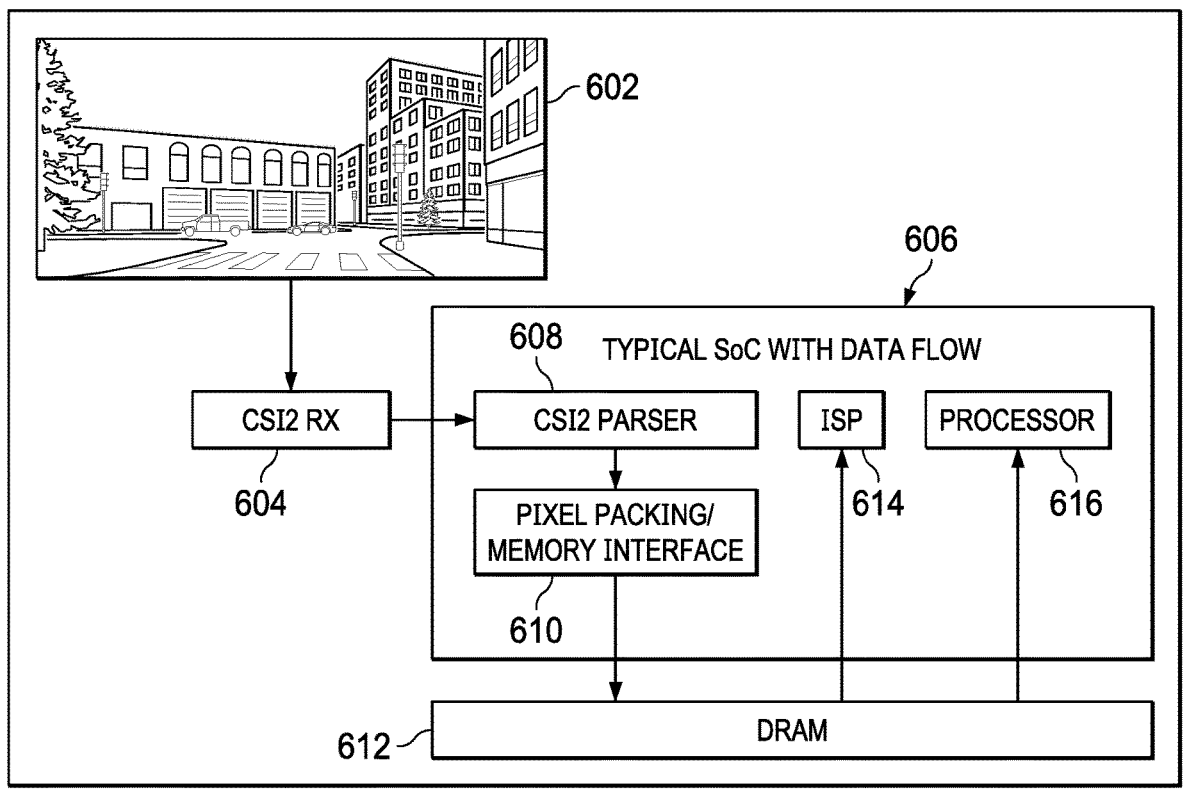
FIG. 6 is a block diagram and sensor data flow in an SoC according to the prior art.

FIG. 6 illustrates operation of a sensor module according to the prior art. A camera 602 provides an output sensor data stream to a CSI-2 receiver (RX) module 604, which in turn provides its output sensor data stream to an SoC 606, and more particularly to a CSI-2 parser 608 in the SoC 606. The CSI-2 parser 608 examines the input sensor data stream to validate packets and to provide signals to separate virtual channels. The output sensor data stream of the CSI-2 parser 608 is provided to a pixel packing and memory interface module 610 so that the data from the camera 602 is directly stored in DRAM 612. An image system processing (ISP) block 614 is connected to the DRAM 612 to receive a sensor data stream from the camera 602 that has been stored in the DRAM 612. Similarly, a processor 616 is connected to the DRAM 612 to receive the camera 602 data. The various users of the data, such as the ISP block 614 and the processor 616, must individually connect to the DRAM 612 and retrieve the desired sensor data or use a DMA channel to retrieve the sensor data. This results in both a delay in operations, as the sensor data stream must be stored DRAM 612, retrieved and reformatted, and a possible bottleneck, should the number of systems requesting data exceed the available bandwidth of the DRAM 612. The limited and inflexible nature of this configuration limits the number of sensors that can be connected to a particular SoC 606 and limits the performance of the sensors of the SoC 606 to lesser limits because of the convoluted data path.

Figure 7:
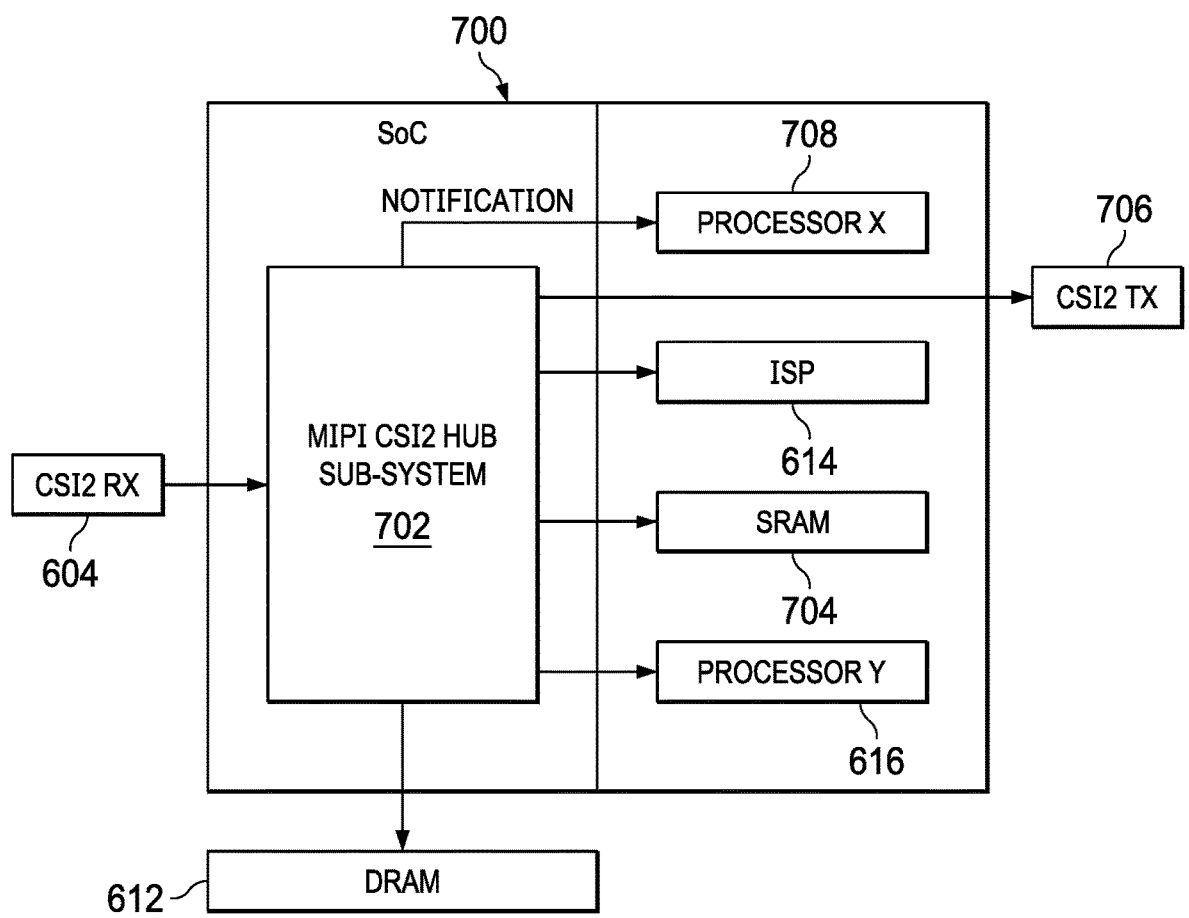
FIG. 7 is a block diagram and sensor data flow in an SoC including a hub for distributing sensor data.

In FIG. 7, a CSI-2 RX module 604, which receives sensor data from modules such as the imager block 329 or radar front end module 436, is connected to an SoC 700, and more particularly to a hub subsystem 702, such as the CSI-2 receive module and hub 548, inside the SoC 700. The hub subsystem 702 distributes the data received from the CSI-2 RX module 604 to any or all of DRAM 612, ISP block 614, processor 616 or SRAM 704. Additionally, an output of the hub subsystem 702 can be provided to a CSI-2 transmit (TX) module 706 to allow sensor data to be provided to a different SoC for use and processing. The hub subsystem 702 provides notifications to a processor X 708. Processor Y 616 and processor X 708 can be any processors in the SoC 700. For instance, in one example processor Y 616 is the microprocessors 502 while the processor X 708 is the microprocessor 506.

Figure 8:
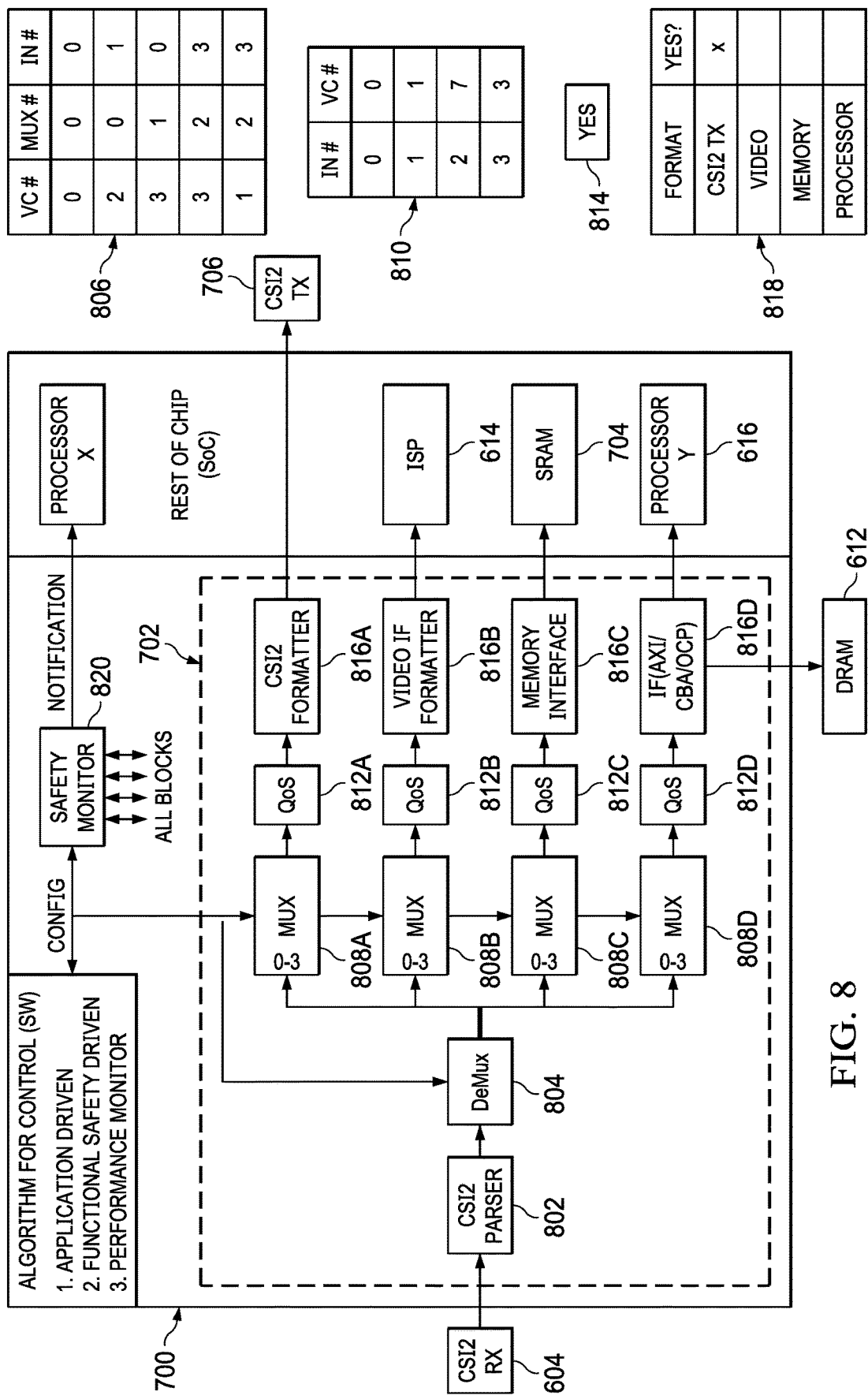
FIG. 8 is a block diagram and sensor data flow of the SoC of FIG. 7.

FIG. 8 is a block diagram of the hub subsystem 702, such as the CSI-2 receive module and hub 548. The CSI-2 RX module 604 provides its output sensor data stream to a CSI-2 parser 802, which analyzes the input CSI-2 sensor data stream that is received and determines the virtual channels that are present in the input sensor data stream. This allows the CSI-2 parser 802 to provide signals, such as a shim for each packet, to split the single physical stream to a series of physical streams based on the logical streams or individual device streams present in the received sensor data stream as defined by the virtual channel values. The output sensor data stream of the CSI-2 parser 802 is provided to a demultiplexer or demux 804 as a demultiplexer input sensor data stream. The demux 804 operates to provide a specified logical output sensor data stream of the CSI-2 parser 802 to various formatting chains based on the signals from the CSI-2 parser 802. For example, the demux 804 can include a table 806, which indicates the distribution of particular received virtual channels in the data stream. For example, the virtual channel 0 input sensor data stream can be routed to multiplexer or mux 0, input 0. Similarly, virtual channel 2, can be provided to multiplexer 0, input 1. Virtual channel 3 can be provided to both mux 1, input 0 and mux 2, input 3, showing that a single input logical sensor data stream can be distributed to multiple multiplexers for operation. The demux 804 performs the stream duplication task to provide individual sensor data streams to each mux at the same time. Virtual channel 1 can be provided to mux 2, input 3, with the demux 804 providing virtual channels 1 and 3 as a single physical sensor data stream. The demux 804 filters out any virtual channel not programmed into the table 806. While a table 806 is shown for explanatory purposes, individual registers can be provided to control the stream splitting and filtering operations of the demux 804.

While a single stream containing virtual channels, thus being considered to be incoming sensor data streams, is shown being received by the demux 804, multiple sensor data streams or channels, each with virtual channels, can be provided to the demux 804 in some examples. In such examples, table 806 may contain an additional column to specify the particular sensor data stream or channel.

The demux 804 is connected to a set of multiplexers 808A, 808B, 808C and 808D. The multiplexers 808A-D operate to redistribute or rename the input sensor data streams to the desired virtual channels. As indicated in a table 810, the input sensor data stream received at input 0 of multiplexer 808A is to be output as virtual channel 0. The input received sensor data stream at input 1 is to be provided as an output sensor data stream at virtual channel 1. The input sensor data stream from input 2 is provided in virtual channel 7. If multiple virtual channels are provided to a single mux input, the input number column is replaced by an input virtual channel value to specify the mapping between the input virtual channel and the output virtual channel. The output sensor data streams of the multiplexers 808A-D go to respective QoS or quality of service modules 812A-D. The QoS modules 812A-D each include a control bit 814, which indicates whether the particular sensor data stream is to be in operating in real-time or non-real-time mode. If operating in real-time mode, the QoS module 812A-D uses an included FIFO to provide buffering for real-time operation. The FIFO provides buffering real time operations with priority escalation of selected logical streams in case the FIFO level is getting full.

The output sensor data streams of the QoS modules 812A-D go to respective output blocks 814A, 814B, 816C and 816D. Each output block 816A-D includes a register as shown in table 818 to indicate the format of the particular output block. That way, by selecting the CSI-2 TX option in the table 818, the output block 816A is configured as a CSI-2 formatter to provide an output sensor data stream to the CSI-2 TX module 706. It is noted that while the output sensor data stream of the output block 816A is shown as connected to the CSI-2 TX module 706, this is not a direct connection but rather performed over the high-speed interconnect 508, so that the output sensor data stream of the output block 816A can be directed to different elements in the SoC 700, particularly any of the possible recipients of a sensor data stream. The illustrated output block 816B is configured to operate as a video interface formatter and is connected to the ISP block 614. The shown output block 816C is configured as a memory interface and is connected to onboard SRAM 704. The output block 816D is configured to operate with a processor and/or RAM and is connected to processor 616 and DRAM 612

Each output block 816A-D further includes data options relevant to the selected format, such as data width, strides, packing and the like. Therefore, the table 818 can be viewed as having additional entries for the particular format options. In an example, the table 818 is a register in each output block 816A-D, with the format options being additional registers. In this example, each output block 816A-D can perform any of the available formatting operations, increasing flexibility of the hub subsystem 702.

As the output sensor data streams of the output blocks 816A-D are provided over the high-speed interconnect 508, great flexibility for different sensors such as video or radar, is provided. For example, two different video sensor data streams can be formatted differently and provided to different processors.

This configuration including the demux 804 and muxes 808A-D provides flexibility to split and combine logical sensor data streams from the various sensors as desired. The demux 804 allows the input sensor data stream to be immediately split into the respective threads for operation, without being stored in the DRAM 612 first. In that manner, the ISP block 614 and the processor 616 do not access the DRAM 612 to obtain the data, so that data provided to them is timelier and DRAM 612 bandwidth is not used. The output blocks 816A-D perform sensor data stream reformatting appropriate for the selected recipient, further reducing processing time and thus timelines of the data processing.

A safety monitor 820, such as the safety MCU 304, 404 or MCU island 560, and any additional specific hardware, is connected to each of the demux 804, muxes 808A-D, QoS modules 812A-D, and output blocks 816A-D to monitor the output sensor data streams of each item for potential errors, such as packet or stream loss or errors, and the like. If an error is detected, an interrupt is provided and the MCU 304, 404 or MCU island 560 performs safety operations, examples of which are provided below.

Figure 9:
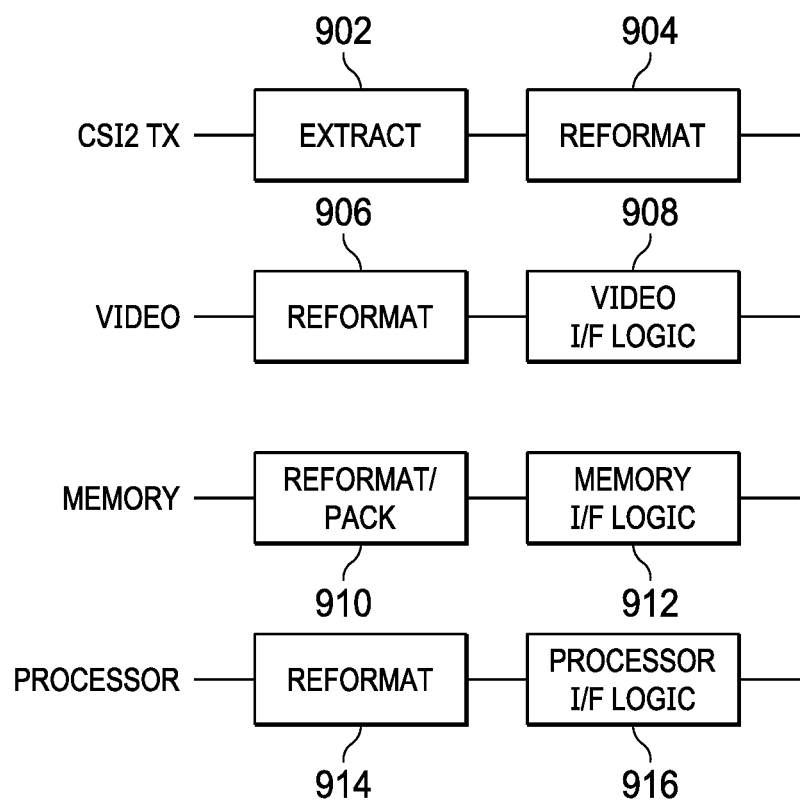
FIG. 9 is a block diagram of a system that performs for reformatting of the sensor data for different destinations.

As illustrated in FIG. 8, the output control block can have a series of different options on handling sensor data streams, options such as CSI-2 TX, video or image format, memory format and processor format. Referring to FIG. 9, if the control block is configured in CSI-2 transmit format, the output sensor data stream from the QoS block 812 is provided to an extract module 902, which extracts the desired virtual channels from the received input sensor data stream and provides output sensor data streams to a reformatter 904 to repackage them in appropriate CSI-2 format, with the desired output virtual channels, for provision to the CSI-2 TX module 706.

If the control block is configured for video or image operation, the output sensor data stream of the QoS block 812 is provided to a reformatter 906, which reformats the input sensor data stream from that provided according to the CSI-2 standard to the respective protocol for the video or ISP subsystem. The reformatted data is provided to a video interface logic block 908, which in turn is connected to the ISP block 614, for example.

If the data is to be provided to memory, the output block is configured to include a reformatter/pack module 910 to reformat the desired virtual channels and then pack or compress the data for storage in memory. The output sensor data stream of the reformatter/pack module 910 is provided to a memory interface logic block 912, which provides an output sensor data stream to the DRAM 612 to store data.

If the data is to be directly operated on by a processor, the data is provided to a reformat block 914 to develop the desired virtual channel sensor data stream for processing. After the reformat block 914, the data is provided to a processor interface logic block 916 for provision to the desired processor.

Figure 10:
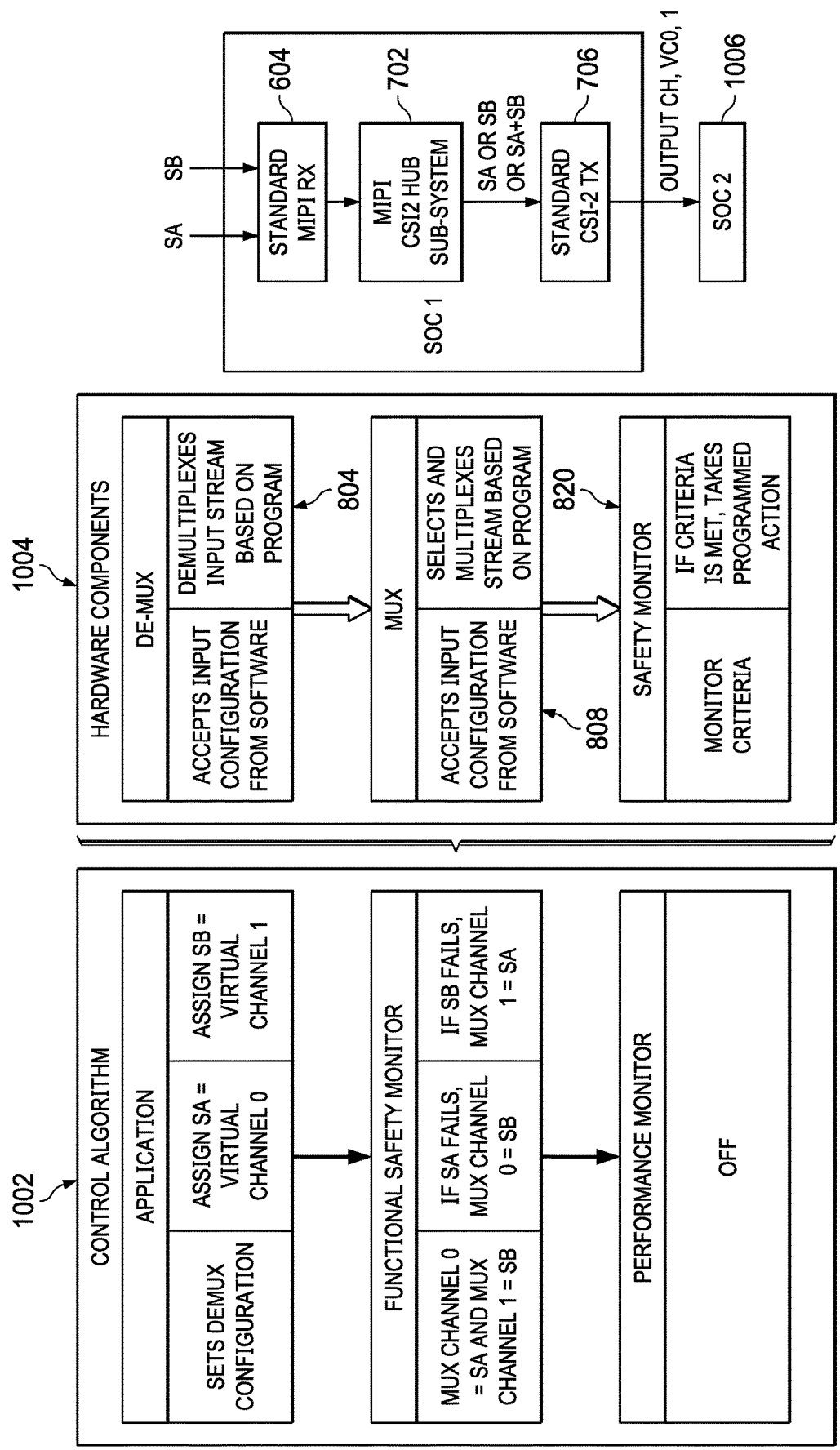
FIG. 10 is a diagram illustrating software and hardware operations and sensor data flow for a functional safety application of the SoC of FIG. 7.

FIG. 10 illustrates operation of some examples of the SoC 700. This illustration is for functional safety, where actions are taken to mitigate risk and damage during a failure. In the illustrated case, two optical input sensor data streams SA and SB are provided and should one of the input sensor data streams fail, the other of the stereo sensor data streams is provided to replace the failed data. The basic algorithm is illustrated in block 1002, which illustrates the basic algorithm for the illustration. As shown in an application section, in a first step, the demux 804 is set to be configured so that input sensor data stream SA is assigned to virtual channel 0 and input sensor data stream SB is assigned to virtual channel 1 and both are provided to two muxes 808. As shown in a Functional Safety Monitor section, the operation of the two sensor channels is then monitored, with the functional safety monitor 820 configured so that virtual channel 0 is assigned the sensor data stream SA and virtual channel 1 the sensor data stream SB. The default setting of the first mux 808 is to select the sensor data stream SA (i.e. virtual channel 0) and the default setting of the second mux 808 is to select the sensor data stream SB (i.e. virtual channel 1). Then, if the sensor data stream SA fails, the first mux 808 is reconfigured to select virtual channel 1, so that the sensor data stream SB is provided on the output. Similarly, if the sensor data stream SB fails, the second mux 808 is reconfigured to provide the sensor data stream SA as the output. A performance monitor section is unused in this functional safety example.

Alternatively, in another example, the sensor data streams SA and SB are provided to one mux 808, which provides sensor data stream SA on output virtual channel 0 and sensor data stream SB on output virtual channel 1. If sensor data stream SA fails, sensor data stream SB is duplicated, with the duplicate sensor data stream being provided as output virtual channel 0, replacing the normal sensor data stream SA. Similarly, if sensor data stream SB fails, sensor data stream SA is duplicated, and the duplicate is provided as output virtual channel 1.

This algorithm is reflected in the hardware block 1004. The demux 804 is configured to output the SA stereo sensor data stream as virtual channel 0 and the SB stereo sensor data stream as virtual channel 1 to the two muxes 808. Each mux 808 is configured based on the state of the particular virtual channels. For normal operation, the first mux 808 simply passes the SA sensor data stream as virtual channel 0 and second mux 808 passes the SB sensor data stream as virtual channel 1. Should a particular virtual channel or sensor data stream fail, then the demux 804 is reprogrammed by the functional safety monitor 820 to duplicate the remaining sensor data stream and provide the duplicated sensor data stream in place of the original stream. The relevant mux 808 is reprogrammed and the mux 808 then reformats the duplicated sensor data stream to have the virtual channel of the failed sensor data stream. Operation of the one mux 808, dual virtual channel input example is similar. A hardware block diagram is provided to illustrate the flow and operation in a block diagram format.

In this manner, functional safety is provided for the stereo sensor data streams SA and SB, so that at all times there are two sensor data streams being provided from the hub subsystem 702 to the CSI-2 TX module 706, so that the downstream SoC 1006 is always receiving to two sensor data streams, though they may be identical.

Figure 11:
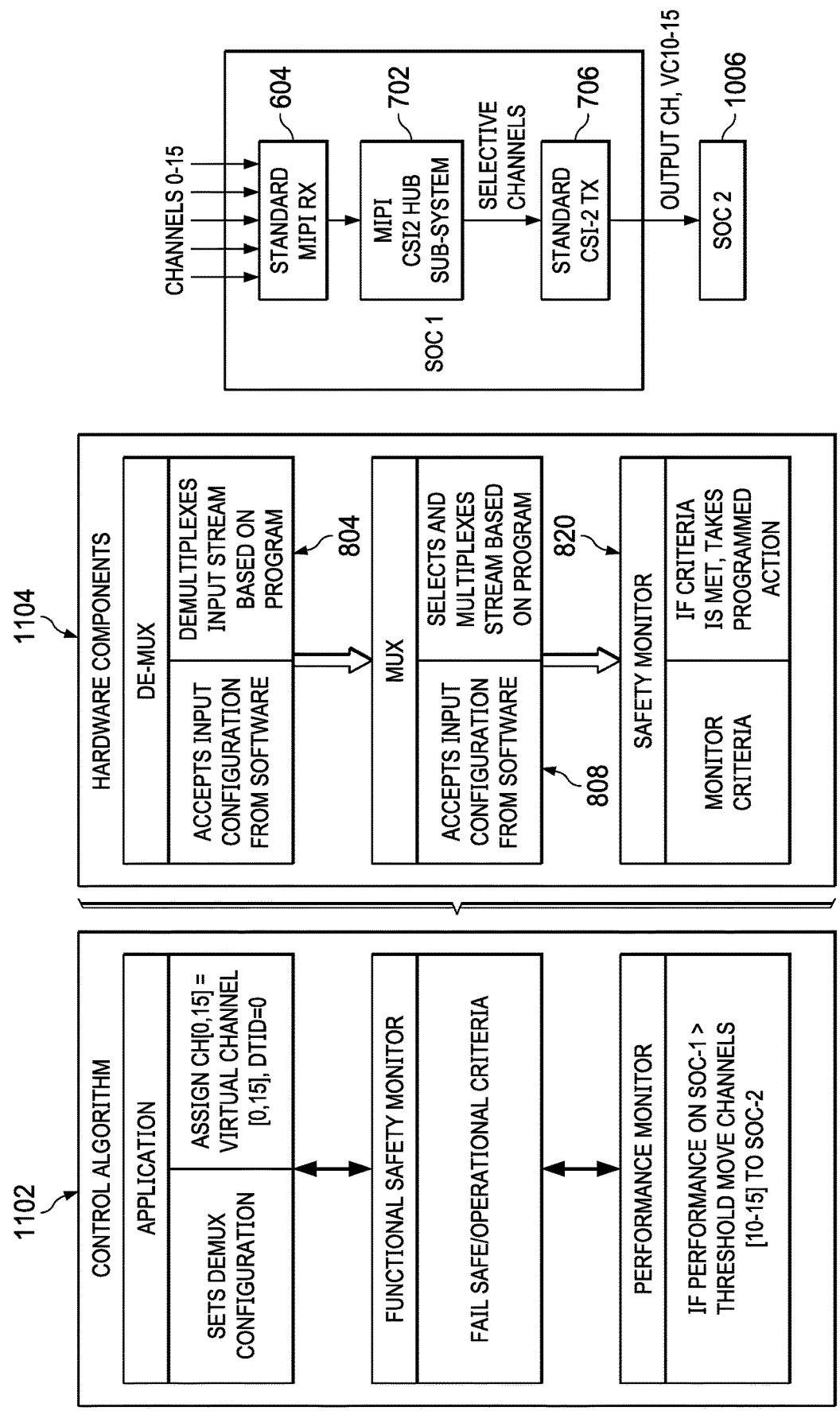
FIG. 11 is a diagram illustrating software and hardware operations and sensor data flow for an elastic processing application of the SoC of FIG. 7.

Depending upon the particular operation or location of the vehicle, if multiple systems present in a given SoC are operating, it may be possible that the SoC does not have the processing capability to properly process all of the incoming sensor data streams. In that case, some of the processing can be transferred to a different SoC with a lesser load. This is known as elastic processing and can be readily developed with the hub subsystem 702. Referring to FIG. 11, the basic algorithm is shown in block 1102, where the application assigns various input channels to various virtual channels for passage through the system. The performance monitor section, which in an example is the microprocessor 506 executing appropriate software, then determines that if the performance on the particular SoC is above given thresholds, then the sensor data streams of virtual channels 10 to 15 are transferred to use SoC 1006 for processing. The transfer of the data streams of the virtual channels 10-15 is done in the hardware components as shown in block 1104, where the demux 804 is configured to properly demultiplex the input channels to the proper muxes 808. If the SoC has the capability to handle all the channels, then the mux 808 is configured to multiplex the various sensor data streams that are received and provide each multiplexed sensor data stream to the proper configured output block for formatting and delivery to the recipient. If, however, the performance monitor indicates that particular channels or sensor data streams cannot be handled, the demux 804 is reprogrammed to provide these sensor data streams to a mux 808 that then combines the sensor data streams as virtual channels 10-15 and provides the output configured for CSI-2 operation to the CSI-2 reformatter 816, which provides its output sensor data streams to the CSI-2 TX module 706 for provision to the SoC 1006.

With this very flexible arrangement provided by the demux, muxes and output blocks, the SoC can be configured and reconfigured dynamically for various operations or functions as desired for the particular car.

Figure 12:
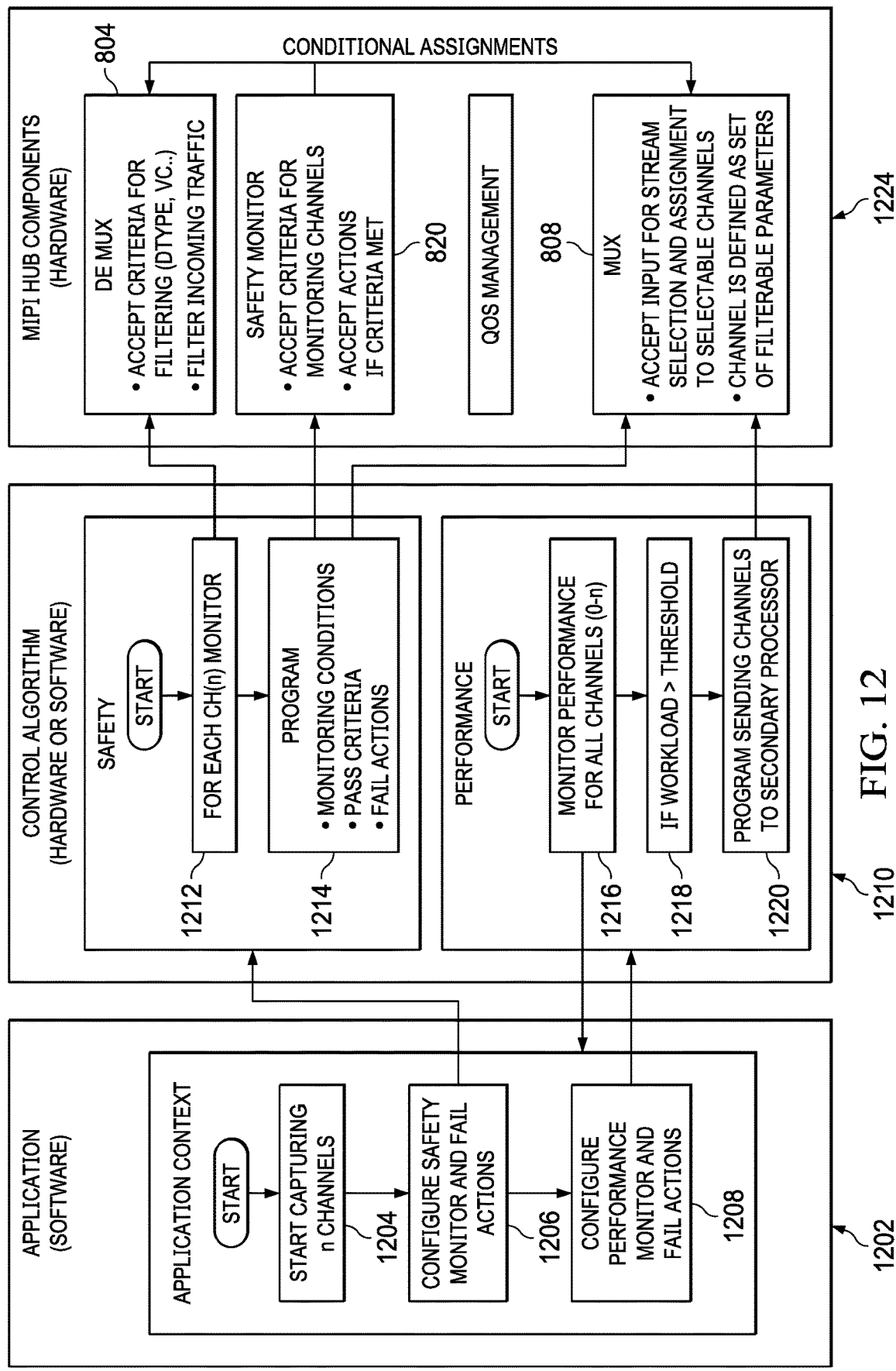
FIG. 12 is a diagram illustrating the general software and hardware operations of the SoC of FIG. 7.

FIG. 12 is a more general format of FIGS. 10 and 11. The application software 1202 determines in step 1204 the various channels or sensor data streams that are being received and the desired outputs. In step 1206 the fail actions for each of the relevant streams is determined and provided to the safety monitor 820. In step 1208, the performance parameters for the particular SoC are determined and provided to the performance monitor for application.

Block 1210 is the control algorithm, which may be done in hardware, software or a combination, by which the safety and performance properties or rules are applied. In step 1212, the particular channels selected are iterated through and the demux 804 is programmed for the proper filtering and demux operations. In step 1214 the particular safety monitoring conditions are determined and the pass criteria and fail operations are programmed into the safety monitor 820. In step 1216, the performance of the particular channels is monitored and in step 1218 a determination is made if a threshold has been exceeded and, if so, in step 1220 the muxes, and potentially the demux, are reconfigured to provide the relevant sensor data streams to the external SoC. Therefore, in the hub subsystem hardware 1224, the demux 804 has been properly configured to filter incoming sensor data streams and route the incoming sensor data streams to the appropriate muxes 808. The safety monitor and performance monitoring operations are performing as desired and the muxes 808 are operating according to the programmed operation. Should safety or performance events occur, the safety monitor 820 and the performance monitor properly reconfigure the demux 804 and the muxes 808 according to the provided rules.

The above description is intended to be illustrative, and not restrictive. For example, the above-described examples may be used in combination with each other. Many other examples will be upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A circuit comprising:
a demultiplexer that includes an input and a set of outputs;
a set of multiplexers that each include a set of inputs coupled to the set of outputs of the demultiplexer and further include an output; and
a demultiplexer table coupled to the demultiplexer, wherein the demultiplexer is operable to:
receive a first data stream that includes a set of virtual channels;
utilize the demultiplexer table to divide the set of virtual channels of the first data stream among the set of outputs of the demultiplexer;
provide a second data stream that includes data of a first subset of the set of virtual channels at a first output of the set of outputs of the demultiplexer; and
provide a third data stream that includes data of a second subset of the set of virtual channels at a second output of the set of outputs of the demultiplexer.

2. The circuit of claim 1 further comprising a set of multiplexer tables, wherein:
each of the set of multiplexer tables is coupled to a respective multiplexer of the set of multiplexers; and
each of the set of multiplexers is operable to:
receive a plurality of data streams from the demultiplexer at the set of inputs of the respective multiplexer;
utilize the respective multiplexer table to combine the plurality of data streams by assigning a respective virtual channel to each of the plurality of data streams; and
provide a fourth data stream that includes data of each of the plurality of data streams at the output of the respective multiplexer.

3. The circuit of claim 2 further comprising a safety monitor configured to:
monitor for an error; and
determine whether to modify at least one of the demultiplexer table or at least one multiplexer table of the set of multiplexer tables based on whether the error is detected.

4. The circuit of claim 1, wherein the demultiplexer is operable to divide the set of virtual channels of the first data stream such that a set of data of the first data stream is provided concurrently at a plurality of outputs of the set of outputs of the demultiplexer.

5. The circuit of claim 1 further comprising a set of formatting blocks that each include:
an input coupled to the output of a respective multiplexer of the set of multiplexers;
an output; and
a register specifying an output format for the respective formatting block, wherein each of the set of formatting blocks is operable to:
receive an input data stream from the respective multiplexer at the input of the respective formatting block;
format the input data stream to be in the output format specified by the register to produce an output data stream; and
provide the output data stream at the output of the respective formatting block.

6. The circuit of claim 5 further comprising a Mobile Industry Processor Interface Alliance Camera Serial Interface 2 (CSI-2) transmitter coupled to the output of a first formatting block of the set of formatting blocks.

7. The circuit of claim 5 further comprising an image signal processor coupled to the output of a first formatting block of the set of formatting blocks.

8. The circuit of claim 5 further comprising a memory coupled to the output of a first formatting block of the set of formatting blocks.

9. The circuit of claim 5 further comprising a processor coupled to the output of a first formatting block of the set of formatting blocks.

10. The circuit of claim 5 further comprising a set of quality of service modules coupled each coupled between the output of a respective multiplexer of the set of multiplexers and the input of a respective formatting block of the set of formatting blocks.

11. The circuit of claim 1, wherein the first data stream is a Mobile Industry Processor Interface Alliance Camera Serial Interface 2 (CSI-2) data stream.

12. The circuit of claim 11, wherein each virtual channels of the set of virtual channels of the first data stream is associated with a respective sensor.

13. An automotive system comprising:
an automobile that includes a plurality of sensors distributed throughout the automobile;
a system-on-a-chip device coupled to the plurality of sensors such that data from the plurality of sensors is received as a first data stream that includes a plurality of virtual channels, wherein the system-on-a-chip device includes:
an input coupled to receive the first data stream;
a demultiplexer that includes an input coupled to the input of the system-on-a-chip device and further includes a set of outputs;
a set of multiplexers that each include a set of inputs coupled to the set of outputs of the demultiplexer and further include an output, wherein the demultiplexer is operable to:
receive the first data stream;
provide a second data stream that includes data of a first subset of the plurality of virtual channels to a first multiplexer of the set of multiplexers; and
provide a third data stream that includes data of a second subset of the plurality of virtual channels to a second multiplexer of the set of multiplexers.

14. The automotive system of claim 13, wherein the system-on-a-chip device further includes a demultiplexer table and the demultiplexer is operable to provide the second data stream and the third data stream based on the demultiplexer table.

15. The automotive system of claim 13, wherein each of the set of multiplexers is operable to:
receive a plurality of data streams from the demultiplexer;
combine the plurality of data streams by assigning each of the plurality of data streams a respective virtual channel to produce a multiplexer output data stream; and
provide the multiplexer output data stream.

16. The automotive system of claim 15, wherein the system-on-a-chip device further includes a set of multiplexer tables, wherein:
each of the set of multiplexer tables is associated with a respective multiplexer of the set of multiplexers; and
each of the set of multiplexers is operable to combine the respective plurality of data streams by assigning virtual channels based on the respective multiplexer table of the set of multiplexer tables.

17. The automotive system of claim 13, wherein the system-on-a-chip device includes a Mobile Industry Processor Interface Alliance Camera Serial Interface 2 (CSI-2) interface coupled to receive the first data stream, and the first data stream is a CSI-2 data stream.

18. The automotive system of claim 13, wherein the system-on-a-chip device includes a safety monitor configured to:
monitor for an error; and
determine whether to reconfigured at least one of the demultiplexer or at least one multiplexer of the set of multiplexers based on whether the error is detected.

19. The automotive system of claim 13, wherein the system-on-a-chip device a set of formatting blocks that each include an input coupled to the output of a respective multiplexer of the set of multiplexers and further include an output.

20. The automotive system of claim 19 further comprising at least one of: a Mobile Industry Processor Interface Alliance Camera Serial Interface 2 (CSI-2) transmit interface, an image signal processor, a memory, or a processor coupled to the set of formatting blocks.

* * * * *